United States Patent
Kalogeropulos et al.

(10) Patent No.: US 7,383,401 B2
(45) Date of Patent: Jun. 3, 2008

(54) METHOD AND SYSTEM FOR IDENTIFYING MULTI-BLOCK INDIRECT MEMORY ACCESS CHAINS

(75) Inventors: Spiros Kalogeropulos, Los Gatos, CA (US); Yonghong Song, Belmont, CA (US); Partha P. Tirumalai, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 179 days.

(21) Appl. No.: 11/446,624

(22) Filed: Jun. 5, 2006

(65) Prior Publication Data

US 2007/0283105 A1   Dec. 6, 2007

(51) Int. Cl.
    *G06F 12/00* (2006.01)
(52) U.S. Cl. ...................... 711/154; 711/137
(58) Field of Classification Search ............... None
    See application file for complete search history.

(56) References Cited

U.S. PATENT DOCUMENTS

| | | | |
|---|---|---|---|
| 6,675,374 B2 | 1/2004 | Pieper et al. | |
| 6,845,501 B2 | 1/2005 | Thompson et al. | |
| 6,934,809 B2 | 8/2005 | Tremblay et al. | |
| 6,951,015 B2 | 9/2005 | Thompson et al. | |
| 6,959,435 B2 | 10/2005 | Ju et al. | |
| 2003/0088863 A1 | 5/2003 | Tirumalai et al. | |
| 2003/0088864 A1 | 5/2003 | Tirumalai et al. | |
| 2003/0105942 A1 | 6/2003 | Damron et al. | |
| 2004/0054990 A1 | 3/2004 | Liao et al. | |
| 2004/0148593 A1 | 7/2004 | Civlin | |
| 2005/0071572 A1 | 3/2005 | Nakashima et al. | |
| 2005/0086652 A1 | 4/2005 | Tian et al. | |
| 2005/0138294 A1 | 6/2005 | Serrano | |
| 2005/0262308 A1 | 11/2005 | Nishiyama | |
| 2007/0283106 A1* | 12/2007 | Kalogeropulos et al. | .... 711/154 |

\* cited by examiner

*Primary Examiner*—Hiep T. Nguyen
(74) *Attorney, Agent, or Firm*—Robert C. Kowert; Anthony M. Petro; Meyertons, Hood, Kivlin, Kowert & Goetzel, P.C.

(57) ABSTRACT

A method and system for identifying multi-block indirect memory access chains. A method may include identifying basic blocks between an entry point and an exit point of a procedure, where the procedure includes a control statement governing its execution. It may be determined whether a probability of execution of a given basic block relative to the control statement equals or exceeds a first threshold value. If so, a respective set of one or more chains of indirect memory accesses may be generated, where each chain includes at least a respective head memory access that does not depend for its memory address computation on another memory access within the given basic block. Chains may be joined across basic blocks dependent upon whether the relative execution probabilities of the blocks exceed a threshold value.

20 Claims, 7 Drawing Sheets

METHOD AND SYSTEM FOR IDENTIFYING MULTI-BLOCK INDIRECT MEMORY ACCESS CHAINS

BACKGROUND OF THE INVENTION

1. Field of the Invention

This invention relates to computer systems, and, more particularly, to compiler techniques for generating anticipatory data prefetches.

2. Description of the Related Art

Historically, the ability of microprocessors to process data has increased at a greater rate than the ability of memory devices to provide such data. For example, a superscalar processor core configured to operate at a 2 GHz rate and to execute two instructions per cycle, each of which processes two 32-bit operands, may exhibit a peak data processing bandwidth of approximately 32 gigabytes per second (GB/s). By contrast, a typical memory module such as a Dual Data Rate 2 Synchronous Dynamic Random Access Memory Module (DDR2 SDRAM) may have a peak data transfer bandwidth in the range of 3-6 GB/s, roughly an order of magnitude less than the processing bandwidth of the processor core. Additionally, a system memory may present a high degree of access latency independent of its bandwidth. For example, owing to the physical distance of the memory from a processor core, transactions to and from the system memory may take a large number of processor cycles to complete, which may result in additional processing delays while the core waits for data.

In typical processor embodiments, a memory hierarchy employing one or more levels of data, instruction and/or unified cache between the processor core and external memory may be implemented in order to attempt to keep frequently used instructions and data in relatively high-bandwidth, low-latency storage. However, cache misses may still necessitate accesses to slower caches or external memory, forcing processing of the missing data to stall until data is returned. Further, since caches are typically much smaller in size than external memory, cache performance may be highly dependent on the behavior of the code or data being processed. For example, code operating iteratively on a data set that is substantially larger than the size of a cache (e.g., a large, multidimensional data array) may result in recurring cache miss behavior, as recently-used data is continually evicted from the cache to be replaced with currently needed data. In such cases, the performance benefit of the cache may be effectively negated.

As another attempt to solve the problem of memory latency, some processors implement hardware-based prefetching, in which processor hardware may attempt to load instructions and/or data from memory prior to those instructions or data actually being needed for execution. If data is success fully prefetched prior to use, the effects of memory latency may effectively be hidden underneath other processing work. However, due to implementation constraints, hardware prefetch mechanisms are typically limited in sophistication and scope. For example, hardware prefetching may adequately handle simple, linear patterns of memory access, but may be unable to effectively process more complicated memory access patterns that may be exhibited by applications employing complex data or control structures.

SUMMARY

Various embodiments of a method and system for identifying multi-block indirect memory access chains are disclosed. According to one embodiment, a method may include identifying a plurality of basic blocks between an entry point and an exit point of a procedure, where the procedure includes a control statement governing execution of the procedure. For a given basic block, it may be determined whether a probability of execution of the given basic block relative to the control statement equals or exceeds a first threshold value. If so, a respective set of one or more chains of indirect memory accesses corresponding to the given basic block may be generated, where each chain includes at least a respective head memory access that does not depend for its memory address computation on another memory access within the given basic block.

For a given chain corresponding to a particular basic block and that includes a head memory access that depends for its memory address computation on another memory access included in a predecessor chain within a different basic block, it may be determined whether a ratio of a probability of execution of the particular basic block relative to the control statement and a probability of execution of the different basic block relative to the control statement equals or exceeds a threshold value. If so, the given chain may be joined to the predecessor chain.

Figure 1:
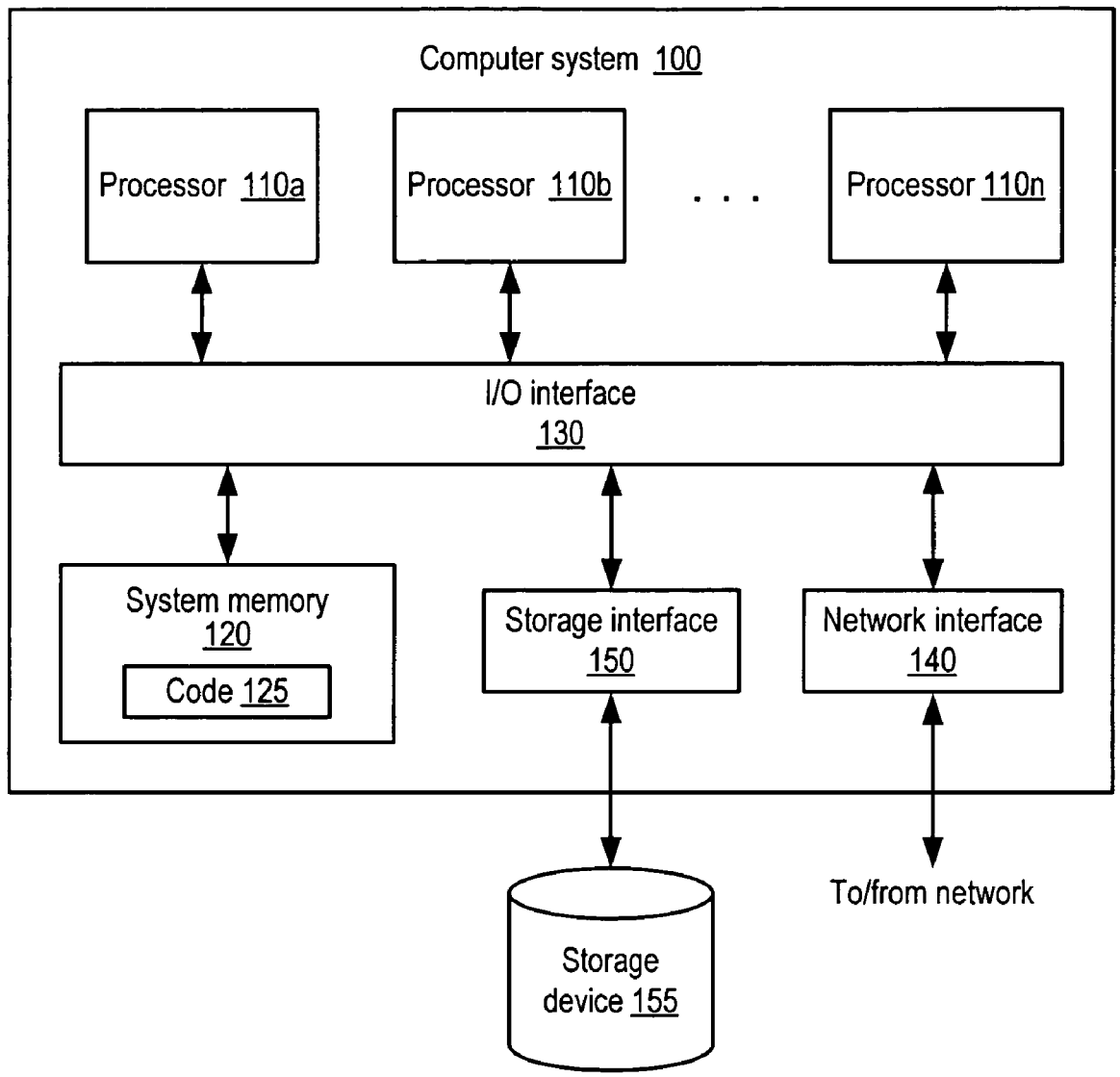
FIG. 1 is a block diagram illustrating one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

In the following discussion, an embodiment of a general computer system is first discussed in detail. Subsequently, an embodiment of a compiler that may be configured to execute on and/or generate executable code for the computer system is described. A technique for identifying chains of indirect memory accesses within a source code procedure is then described, followed by a discussion of several techniques in which such chains may be employed to generate prefetch information for the procedure.

Overview of Exemplary Computer System and Compiler

FIG. 1 illustrates one embodiment of a computer system through which the various memory chain formation and prefetching techniques described herein may be implemented. In the illustrated embodiment, computer system 100 includes one or more processors 110 coupled to a system memory 120 via an input/output (I/O) interface 130. Computer system 100 further includes a network interface 140 and a storage interface 150 coupled to I/O interface 130. As described below, network interface 140 may be configured for coupling system 100 to a network to which other systems or devices may be coupled. Storage interface 150 may be configured to couple to a mass storage device 155.

In various embodiments computer system 100 may be a uniprocessor system including one processor 110, or a multiprocessor system including several processors 110 (e.g., two, four, eight, or another suitable number). Processors 110 may be any suitable processor capable of executing instructions. For example, in various embodiments processors 110 may be a general-purpose or embedded processor implementing any of a variety of instruction set architectures (ISAs), such as the x86, PowerPC, SPARC, or MIPS ISAs, or any other suitable ISA. In multiprocessor systems, each of processors 110 may commonly, but not necessarily, implement the same ISA.

System memory 120 may be configured to store instructions and data accessible by processor 110. In various embodiments, system memory 120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions or applications, such as those described in detail below, are shown stored within system memory 120 as code 125.

In one embodiment, I/O interface 130 may be configured to coordinate I/O traffic between processor 110, system memory 120, and any peripheral devices in or attached to the system, including network interface 140, storage interface 150 or other peripheral interfaces. In some embodiments, I/O interface 130 may perform any necessary protocol, timing or other data transformations to convert data or control signals from one component (e.g., system memory 120) into a format suitable for use by another component (e.g., processor 110). In some embodiments, I/O interface 130 may include support for devices attached through various types of peripheral buses, such as a variant of the Peripheral Component Interconnect (PCI) bus standard or the Universal Serial Bus (USB) standard, for example. In some embodiments, the function of I/O interface 130 may be split into two or more separate components, such as a north bridge and a south bridge, for example. Also, in some embodiments some or all of the functionality of I/O interface 130, such as an interface to system memory 120, may be incorporated directly into processor 110.

Network interface 140 may be configured to allow data to be exchanged between computer system 100 and other devices attached to a network, such as other computer systems, for example. In various embodiments, network interface 140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Storage interface 150 may be configured to allow system 100 to interface with a mass storage device such as storage device 155. For example, storage interface 150 may support standard storage interfaces such as one or more suitable versions of the Advanced Technology Attachment Packet Interface (ATAPI) standard (which may also be referred to as Integrated Drive Electronics (IDE) technology), the Small Computer System Interface (SCSI) standard, the IEEE 1394 "Firewire" standard, the USB standard, or another standard or proprietary interface suitable for interconnecting a mass storage device with system 100. In various embodiments, storage device 155 may include magnetic, optical or solid state media that may be fixed or removable. For example, storage device 155 may correspond to a hard disk drive or drive array, a CD or DVD drive, or a nonvolatile memory (e.g., Flash)-based device.

System memory 120 and storage device 155 may be exemplary embodiments of a computer-accessible storage medium configured to store program instructions and data such as code 125. However, in other embodiments, program instructions and/or data may be received, sent or stored upon different types of computer-accessible media. Generally speaking, a computer-accessible medium or storage medium may include any type of mass storage media or memory media such as magnetic or optical media, e.g., disk or CD/DVD-ROM coupled to computer system 100 via I/O interface 130. A computer-accessible medium or storage medium may also include any volatile or non-volatile media such as RAM (e.g. SDRAM, DDR SDRAM, RDRAM, SRAM, etc.), ROM, etc, whether included in computer system 100 as system memory 120 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 140.

In one embodiment, code 125 may be configured to implement a compiler. Generally speaking, a compiler may be configured to translate or transform source code, which may be represented in a high-level programming language such as C, C++ or any other suitable programming language, into object code. The language in which the source code is expressed may be referred to as the source code language or simply the source language. Typically, object code may be represented in the form of instructions and data suitable for processing by a target computing architecture. Object code may be represented in machine-readable form (e.g., binary form), in human-readable form (e.g., assembly language) that may require additional steps to generate machine-readable code, or in a combination of human- and machine-readable forms. The target architecture for the object code may be the same as the ISA implemented by processor(s) 110 on which the compiler is configured to execute. However, in some embodiments a compiler may be configured to generate object code for a different ISA than the ISA on which the compiler executes. Such a compiler may be referred to as a cross-compiler.

Figure 2:
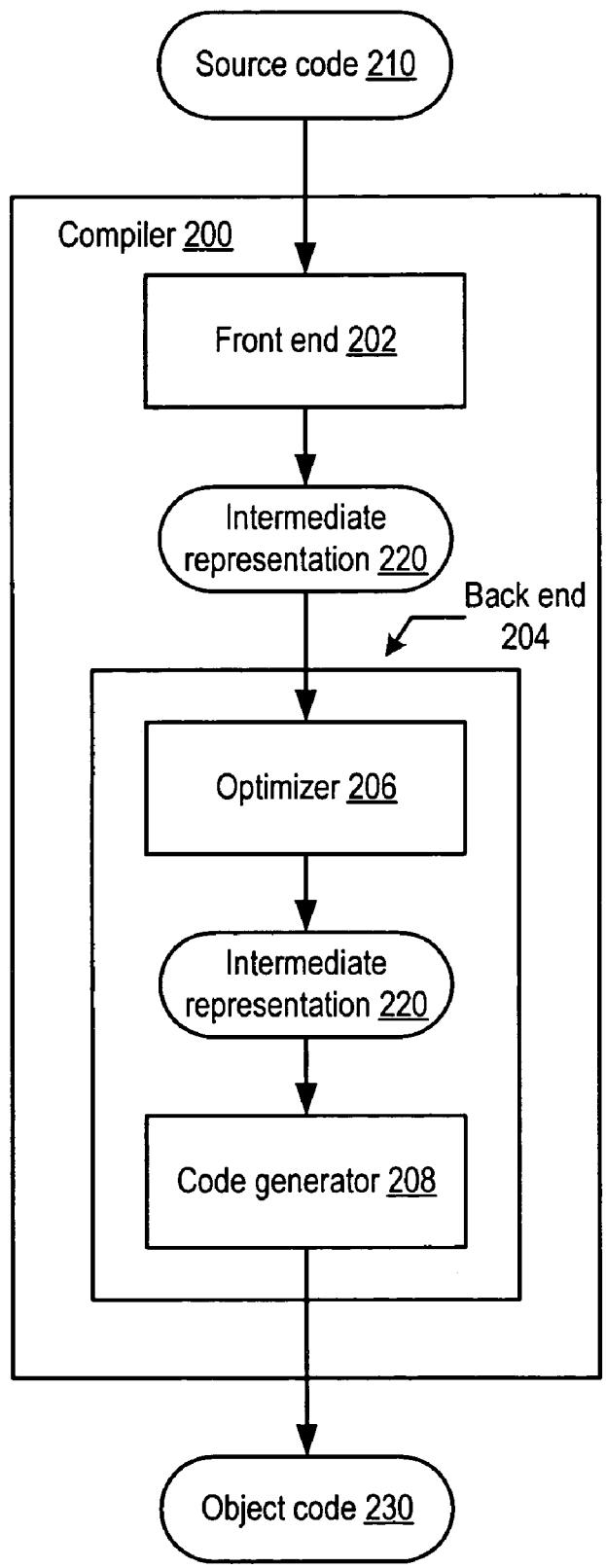
FIG. 2 is a block diagram illustrating one embodiment of a compiler.

One embodiment of a compiler is illustrated in FIG. 2. In the illustrated embodiment, compiler 200 includes a front end 202 and a back end 204, which may in turn include an optimizer 206 and a code generator 208. As shown, front end 202 may be configured to receive source code 210, which may correspond to the code that is to be compiled into object code. It is noted that while source code 210 may generally correspond to a high-level programming language, in some embodiments source code 210 may correspond to a machine-level language such as assembly language. For example, in some embodiments compiler 200 may be configured to apply its optimization techniques to assembly language code in addition to code written in higher-level programming languages. It is also contemplated that in some embodiments, compiler 200 may include a number of different instances of front end 202, each configured to process source code 210 written in a different respective language and to produce a similar intermediate representation for processing by back end 204. In such embodiments, compiler 200 may effectively function as a multi-language compiler. For example, in one such embodiment, compiler 200 may include a first instance of front end 202 configured to process C/C++ source code, another instance of front end 202 configured to process FORTRAN source code, and a third instance of front end 202 configured to process Pascal source code, though other embodiments may be configured to support other combinations of source code languages.

In one embodiment, front end 202 may be configured to perform preliminary processing of source code 210 to determine whether the source is lexically and/or syntactically correct, and to perform any transformation suitable to ready source code 210 for further processing by back end 204. For example, front end 202 may be configured to process any compiler directives present within source code 210, such as conditional compilation directives that may result in some portions of source code 210 being included in the compilation process while other portions are excluded. Front end 202 may also be variously configured to convert source code 210 into tokens (e.g., according to whitespace and/or other delimiters defined by the source language), determine whether source code 210 includes any characters or tokens that are disallowed for the source language, and determine whether the resulting stream of tokens obeys the rules of syntax that define well-formed expressions in the source language. In different embodiments, front end 202 may be configured to perform different combinations of these processing steps, may omit certain steps described above, or may include different steps, depending on the implementation of front end 202 and the source language to which front end 202 is targeted. For example, if a source language does not provide a syntax for defining compiler directives, an embodiment of front end 202 configured to process that source language may omit a processing step that includes scanning source code 210 for compiler directives.

If front end 202 encounters errors during processing of source code 210, it may abort processing and report the errors (e.g., by writing error information to a log file or to a display). Otherwise, upon sufficiently analyzing the syntactic and semantic content of source code 210, front end 202 may generate an intermediate representation 220 of source code 210. Generally speaking, intermediate representation 220 may include one or more data structures that represent the structure and semantic content of source code 210, such as syntax trees, graphs, symbol tables or other suitable data structures. Intermediate representation 220 may be configured to preserve information identifying the syntactic and semantic features of source code 210, and may also include additional annotation information generated through the parsing and analysis of source code 210. For example, intermediate representation 220 may include control flow graphs that explicitly identify the control relationships among different blocks or segments of source code 210. Such control flow information may be employed by back end 204 to determine, for example, how functional portions of source code 210 may be rearranged (e.g., by optimizer 206) to improve performance while preserving necessary execution-ordering relationships within source code 210.

Back end 204 may generally be configured to transform the intermediate representation 220 into object code 230. Specifically, in the illustrated embodiment, optimizer 206 may be configured to transform the intermediate representation 220 in an attempt to improve some aspect of the resulting object code 230. For example, optimizer 206 may be configured to analyze intermediate representation 220 to identify opportunities for generating prefetch operations, as described in greater detail below. In some embodiments, optimizer 206 may be configured to perform a variety of other types of code optimization such as loop optimization (e.g., loop fusion, loop unrolling, etc.), data flow optimization (e.g., common subexpression elimination, constant folding, etc.), or any other suitable optimization techniques. In the illustrated embodiment, the intermediate representation 220 generated by front end 202 and produced as a result of transformations by optimizer 206 may be the same general type of representation. However, in other embodiments optimizer 206 may be configured to produce a different representation than the intermediate representation 220 provided to it as an input.

In one embodiment, code generator 208 may be configured to process intermediate representation 220, as transformed by optimizer 206, in order to generate object code 230. For example, code generator 208 may be configured to generate machine instructions defined by the ISA of the target architecture such that execution of the generated instructions by a processor implementing the target architecture (e.g., one of processors 110, or a different processor) may implement the functional behavior specified by source code 210. In one embodiment, code generator 208 may also be configured to generate instructions corresponding to operations that may not have been inherent in source code 210, but which may have been added by optimizer 206 during the optimization process. For example, code generator 208 may be configured to insert explicit prefetch operations within object code 230 at locations identified by optimizer 206, as described in greater detail below. In some embodiments, code generator 208 may be configured to perform certain types of object code optimization in addition to the transformations that may be performed by optimizer 206, such as peephole optimization, loop unrolling, software pipelining, instruction scheduling and/or other optimization techniques.

In other embodiments, compiler 200 may be partitioned into more, fewer or different components than those shown. As noted above, any of the components of compiler 200, and any of the methods or techniques performed thereby including those described below with respect to FIGS. 3-6, may be implemented partially or entirely as code 125 and stored within a suitable computer-accessible storage medium.

Identification of Chains of Indirect Memory Addresses

As mentioned above, the effect of memory latency may negatively impact data processing if data required for processor execution is not readily available. Prefetching of data in advance of such data being needed may help reduce the overall impact of memory latency, increasing processing performance. However, certain patterns of data access may be particularly difficult to prefetch at runtime (e.g., through the use of hardware-based prefetching). Consider the following fragment of C-like pseudocode:

```
for(i=0; i<n; i++)
    t1 = a[i];
    t2 = b[t1];
    if(condition) {
        t3 = c[t2];
        t4 = d[t3];
    }
}
```

In this code fragment, an iterative for-loop is shown to include a number of memory accesses a[i], b[t1], c[t2] and d[t3]—that is, references to data stored within a memory address space. Memory accesses may be distinct from references to data stored within a processor register, or references to constant or immediate data, which may be obtained without reference to a memory address space. In one embodiment, each assignment operation shown in the code fragment may be implemented by a processor 110 as one or more operations including at least a load operation to an address of a data value, which may be stored within system memory 120, storage device 155, or within a cache included within or associated with one or more of processors 110. In the illustrated code fragment, the memory accesses are illustrated as simply, one-dimensional array references, where the notation M[N] denotes a reference to element N of an indexed set or array of elements M. However, in other code embodiments, the addressing patterns employed by each memory access may be more complicated than one-dimensional array accesses, and may employ arbitrarily complex addressing functions. For example, the assignment to t2 may include references to other data values in addition to the value specified by b[t1]. These other data values may be specified as additional memory accesses, as results of functions, as constant data, or as any other suitable type of data, and such other values may be combined within an arbitrarily complex function to produce the result assigned to t2. It is noted that direct and indirect memory accesses may correspond to either load or store operations. That is, they may appear on either side of an assignment statement within source code 210.

As shown in this example, the memory access a[i] depends only on the loop variable i, whereas access b[t1] depends on a[i] via the assignment variable t1. In turn, memory access c[t2] depends on b[t1] via t2, and d[t3] depends on c[t2] via t3. Additionally, the memory accesses c[t2] and d[t3] occur conditionally, dependent on evaluation of the if-statement, whereas the memory accesses a[i] and b[t1] occur during every iteration of the for-loop. Generally speaking, a memory access having a memory address that depends, directly or indirectly, on the result of another memory access within the same procedure (e.g., the illustrated for-loop) may be referred to as an indirect memory access. Conversely, a memory access having a memory address that does not depend on the result of another memory access within the same procedure may be referred to as a direct memory access. Thus, memory access a[i] may be considered a direct memory access, while memory accesses b[t1], c[t2] and d[t3] may be considered indirect memory accesses. As generally used herein, the address within a memory address space that is targeted or specified by a memory access may simply be referred to as the address of the memory access.

It is noted that a given memory access may be an indirect access regardless of the number of intervening assignments or operations in the dependency chain between the given access and the memory access on which it depends. It is further noted that a direct memory access within a procedure may depend for its address computation on another statement or variable within that procedure that is not a memory access or dependent on a memory access, such as an iteration variable. That is, the address of a direct memory access need not be static, but in some cases may be predictably variant. For example, the address of a direct memory access may be a simple or complex function of an iteration variable.

By virtue of a given indirect memory access's dependence on another memory access to determine its own memory address, an indirect memory access may not be able to execute until the memory access on which it depends has executed and returned data. Thus, sequences or chains of dependent indirect memory accesses such as illustrated above may be particularly sensitive to memory latency issues. For example, the address of a given indirect memory access, and consequently its cache hit or miss status, may not be known until the access(es) on which it depends are complete. However, the prior accesses may themselves incur high latency due to cache misses, such that in the worst case, each memory access in the chain may incur the full memory access latency of system memory 120 (or storage device 155, e.g., in a paged virtual memory system).

Given the potential for high cumulative latency of a chain of indirect memory accesses, such a chain may be a good candidate for generating prefetch operations. For example, in one embodiment compiler 200 may be configured to generate prefetch operations for each of the memory accesses in the example above. If, as a result of executing such prefetch operations, data targeted by each access were successfully installed in a fast cache or register file within processor 110, the effect of the sequential dependencies among the memory accesses on execution latency may be minimized.

However, prefetch generation strategy may be complicated by the conditional nature of certain members of a chain of indirect memory accesses. In some instances, prefetching may have an associated cost in terms of execution behavior or performance. For example, data prefetching may result in increased memory bandwidth utilization, which may increase the latency of other memory accesses. Also, prefetching data into a cache may result in other cache data being evicted due to capacity constraints, which may in turn result in cache misses when subsequent memory accesses attempt to retrieve evicted data. Because of the potential overhead costs of prefetching relative to performance gain, it may be advisable to avoid prefetching data that is unlikely to be used, such as when a memory access resides in an infrequently-executed conditional block. Moreover, in some instances conditional execution may be used to avoid accessing certain types or ranges of memory addresses, and prefetching such deliberately excluded memory addresses may cause undesirable side effects that may detract from execution performance (e.g., memory faults due to misaligned accesses, segmentation or protection violations, etc.). Thus, in one embodiment compiler 200 may be configured to take the probability of execution of a memory access into account when generating prefetch operations, as described in detail below.

To implement compiler-generated prefetching for chains of indirect memory accesses, compiler 200 may be configured to first identify the chains or potential chains that exist within a procedural block of code, or simply a "procedure". Generally speaking, a procedure may have a single entry point and may include a number of programming statements that are all subject to the same control statement. For example, a procedure may be an iterative loop of code that includes a control statement (e.g., a "for" statement, a "while" statement, a conditional branch, or any other suitable control statement) defining the nature of the iteration as well as other statements forming the body of the procedure. However, in some embodiments procedures need not be loops. For example, in such embodiments functions or subroutines may be considered procedures. It is contemplated that procedures may be included within other procedures. For example, loops may be nested within other loops.

In various embodiments, different techniques may be employed in selecting a procedure for analysis of indirect memory access chains. In one embodiment, procedures may be selected for analysis on the basis of hierarchy, e.g., such that an outermost or innermost procedure is selected. In another embodiment, procedures may be selected on the basis of some characteristic of the procedure. For example, loop procedures may be prioritized for analysis over non-loop procedures. Further, loop procedures that define a larger number of iterations and/or that include nested loops may be prioritized for analysis over loop procedures defining a smaller number of iterations and/or that lack nested loops. In some embodiments, only those procedures satisfying one or more criteria for analysis may be selected for analysis of indirect memory access chains. Such criteria may specify particular requirements for type of procedure (e.g., loop vs. non-loop) or more particular characteristics of the procedure.

In some embodiments, a procedure may be selected for analysis on the basis of its control flow characteristics relative to other paths in a general control flow graph. For example, a probabilistic control flow analysis of source code 210 may indicate that a function may be predictably called (e.g., with at least some threshold level of probability) owing to a loop or other control statement at a higher level of hierarchy within the code. In such an embodiment, the function may be selected for indirect memory chain analysis even though a different procedure may be responsible for the predictable or iterative execution of the function.

A given procedure may be further subdivided into basic blocks. Generally speaking, a basic block of code may include one or more instructions or statements bounded by control flow statements, such as procedure entry/exit points, conditional statements, branches, or any other type of programming construct that may cause the flow of execution control of source code 210 to change. In terms of control flow analysis, the general control flow of code within a basic block enters at the beginning of the block and leaves at the end of the block without the possibility of branching out of the block prior to the end of the block. Thus, referring to the for-loop pseudocode example shown above, the assignments to t1 and t2 belong to a different basic block than the assignments to t3 and t4, because the if-statement following the assignment to t2 presents a control flow boundary where the subsequent statements may or may not be executed depending on the condition evaluated by the if-statement. In some embodiments, the possibility of a source code instruction or statement causing a change in control flow due to a run-time fault or exception may be considered in determining the bounds of a basic block, while in other embodiments the bounds of a basic block may be determined without regard to faults or exceptions.

Figure 3A:
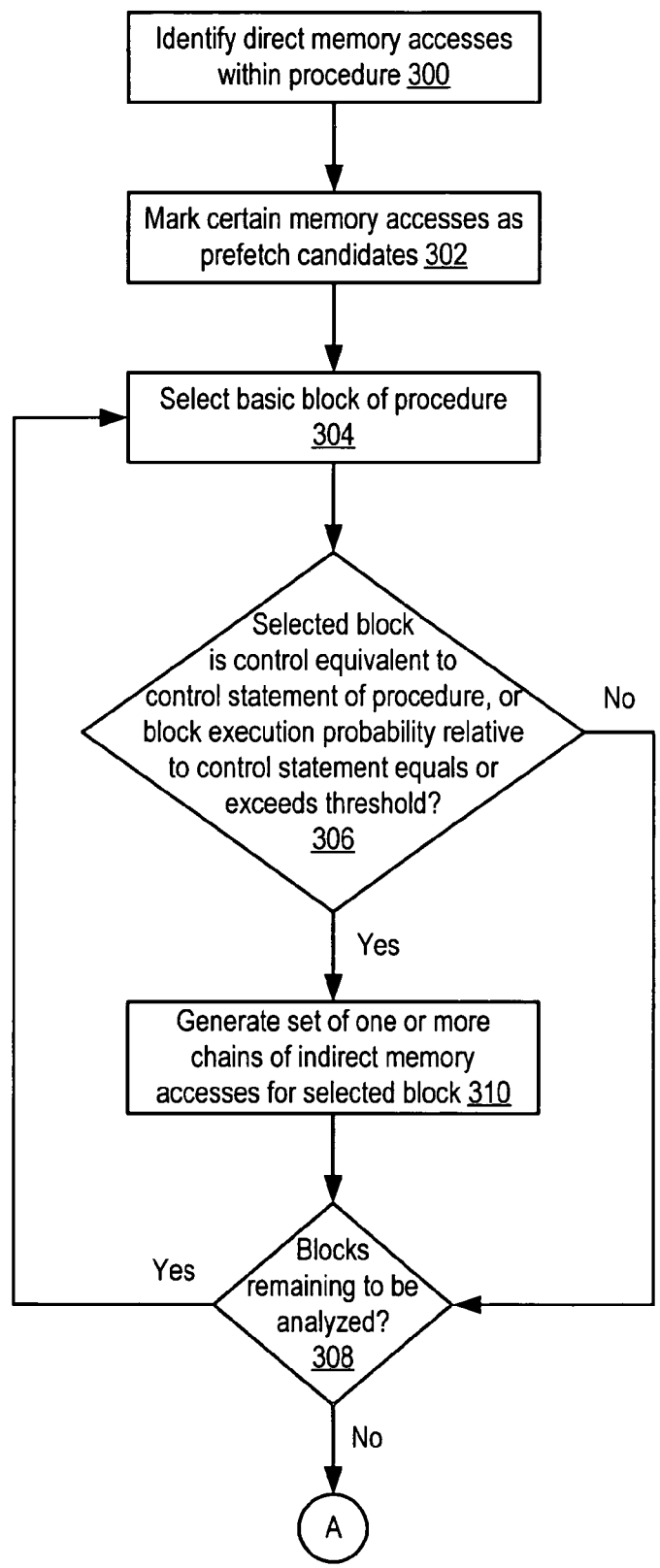
FIGS. 3A-B show a flow diagram illustrating one embodiment of a method of identifying chains of indirect memory accesses within a source code procedure.
Figure 3B:
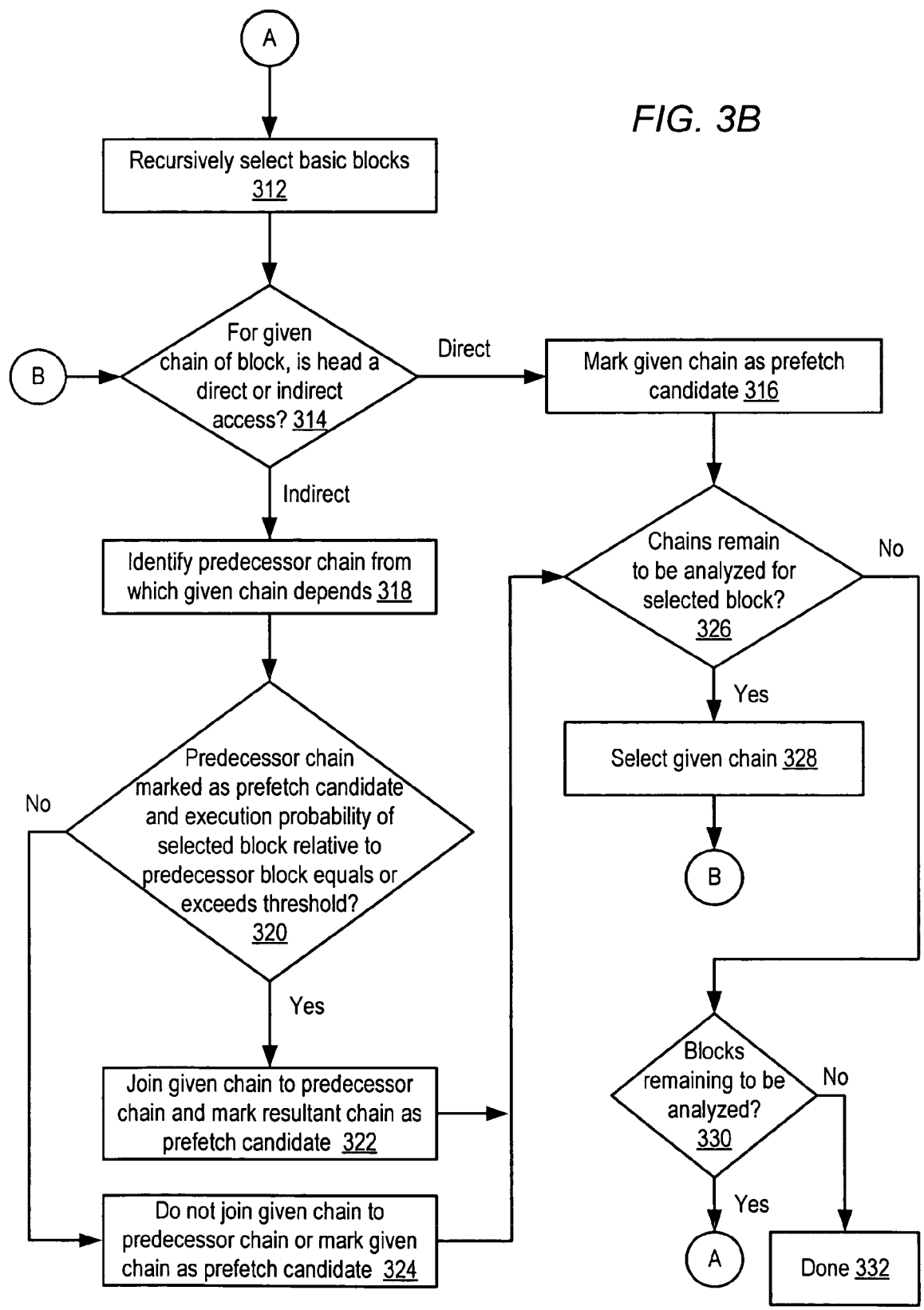

In one embodiment, to identify chains of indirect memory accesses within a given procedure of source code 210, compiler 200 may be configured to employ a method of identifying such chains within basic blocks and attempting to join or link such chains across basic blocks dependent upon the relationships among the execution probabilities of the basic blocks. One embodiment of such a method, which in various embodiments may be implemented by optimizer 206 or by another component of compiler 200, is illustrated in FIGS. 3A-B. Referring collectively to FIGS. 1-3, operation of the method begins in block 300, where the direct memory accesses within the procedure are identified. As noted above, a direct memory access within a procedure does not depend upon another memory access within the procedure, although a given direct memory access may depend on other variables such as a loop iteration variable. In some embodiments in which the procedure iterates in a predictable fashion, such as for loop procedures, identifying a given direct memory access may include determining how the address of the given direct memory access changes from iteration to iteration, if possible. Such a change may also be referred to as a stride or stride value of the given direct memory access. Example of techniques for determining a stride of a direct memory access may be found in U.S. patent application Ser. No. 10/052,999, entitled "Method and Apparatus for Inserting Prefetch Instructions in an Optimizing Compiler" and filed Nov. 2, 2001, which is hereby incorporated by reference in its entirety.

Certain memory accesses may be marked as prefetch candidates (block 302). Marking an access may include annotating a representation of the access within intermediate representation 220, for example by storing a value to a field of a data structure corresponding to the access, where the field is configured to indicate some property of the access such as, e.g., prefetch candidacy. In some embodiments, all direct memory accesses may be marked as prefetch candidates for which prefetch operations may later be inserted into object code 230. Additionally, in some embodiments, any indirect memory access within the procedure may be marked as a prefetch candidate if it depends for its address computation on either a direct memory access within the procedure or another indirect memory access within the procedure that is marked as a prefetch candidate.

In some embodiments, to qualify as prefetch candidates, direct or indirect memory accesses may additionally be required to be predictably variant or loop variant. That is, a memory access may be expected to recur in a predictable way, for example because the access occurs within an explicit loop procedure and depends in some way on a loop variable, or because the access has otherwise been identified (e.g., through control flow analysis) as predictably recurrent. By contrast, a memory access that is predictably invariant with respect to a procedure may not recur in a detectably predictable way with respect to the procedure, or may recur in a trivial way. For example, a predictably invariant memory access may be effectively constant or static across multiple iterations of a procedure, or may vary across iterations in a way that is poorly correlated or uncorrelated with the control statement that governs procedure iteration. In some cases, predictably variant memory accesses may benefit more from prefetching than predictably invariant memory accesses. However, it is noted that determining variance or invariance of a memory access need not be a prerequisite for marking that access as a prefetch candidate.

A basic block of the procedure may then be selected (block 304) and evaluated to determine whether the selected basic block is either control equivalent to the control statement that governs execution of the procedure, or whether the execution probability of the basic block relative to the control statement that governs execution of the procedure equals or exceeds a threshold value (block 306). To determine control equivalence of two basic blocks, the dominance and postdominance relationships between the blocks may be considered. Generally speaking, a block A in a procedure dominates another block B if every control flow path between the entry point of the procedure and block B passes through block A. That is, whenever block B executes, block A also executes. Similarly, a block B in a procedure postdominates another block A if every control flow path between block A and the exit point of the procedure passes through block B, such that whenever block A executes, block B executes. Two basic blocks A and B may be considered to control equivalent if block A dominates block B and block B postdominates block A (or vice versa), such that if either block executes, the other block will execute. A given basic block may be said to be control equivalent to itself.

The control statement governing execution of a procedure may be considered part of the first basic block of the procedure. For example, in an embodiment where the procedure is a loop, the loop header (e.g., a for-statement or while-statement) may correspond to the control statement of the procedure, and the statements following the loop header up until the first block boundary may be considered part of the first basic block of the loop. Thus, the test shown in block 306 may be satisfied if a given basic block is control equivalent to the first basic block of the loop that is bounded by the loop header.

A given basic block within a procedure (e.g., the if-statement in the above for-loop example) may have an associated execution probability that may be determined by a variety of techniques. For example, the execution probability of the above-referenced if-statement block may be 85%, indicating that in any given iteration of the loop, there is an 85% chance the if-statement block will be executed. In some embodiments, the execution probability of a basic block may be determined through empirical profiling techniques in which source code 210 may be instrumented to gather runtime statistics on frequency of execution of blocks and procedures. For example, additional code configured to count the number of occurrences of blocks and procedures may be added to source code 210, which may then be compiled and executed under various input conditions to gather a representative sample of how frequently various code portions execute. Such gathered statistics may then be fed back into compiler 200 and taken into account during a subsequent compilation of source code 210. Alternatively, structural analysis of code or heuristic techniques may be employed to estimate an execution probability of a basic block. For example, iteration counts of certain loop procedures may be known or estimated at compile time and may be used to estimate execution probabilities of certain basic blocks included in the loops. If no other execution probability for a given basic block has been determined, in some embodiments a default value may be assumed. Alternatively, in the absence of other execution probability information for the given basic block, the execution probability threshold test of block 306 may be disregarded, and the given basic block may be tested only to determine whether it is control equivalent to the procedure's control statement.

It is noted that in some cases, determining the execution probability of a given basic block relative to a procedure's control statement header may be considered to include determining whether the given basic block is control equivalent to the procedure's header. That is, determining that the given basic block is control equivalent to the procedure's header may be equivalent to determining that the execution probability of the given block relative to the procedure's header is equal to 1. In various embodiments, the threshold value for testing the execution probability of the selected basic block may be determined heuristically or empirically, based on the tradeoffs between the performance improvements and costs (e.g., due to side effects) of increasingly aggressive prefetching corresponding to decreased threshold probability values for various types of source code. That is, as the threshold value decreases, basic blocks with lower execution probabilities may be selected for indirect memory access chain formation and subsequent prefetch generation. In some embodiments, the threshold value may be selected from the range 0.6-0.9, although other values may be chosen.

If the execution probability of the selected basic block does not exceed the threshold value or the selected block is determined not to be control equivalent to the procedure's header, then if there are blocks remaining to be analyzed (block 308) operation may proceed from block 304. If no blocks remain to be analyzed, operation may proceed to block 312, described below.

Otherwise, a set including one or more chains of indirect memory accesses may be generated for the selected basic block (block 310). Generally speaking, an indirect memory access chain (or simply a chain) may include one or more memory accesses as elements. In one embodiment, a given indirect memory access chain within a basic block may be generated by first identifying the head of the chain, which may correspond to either a direct memory access or an indirect memory access that is marked as a prefetch candidate and that does not depend on other memory accesses within the selected basic block. Subsequent to identifying the head of the chain, other indirect memory accesses within the selected basic block that depend either on the head of the chain or on other indirect memory accesses within the chain may be added to the chain. It is noted that a chain may include only a single memory access, which may be a direct or indirect memory access, or may include an arbitrary number of accesses. Also, memory accesses within the selected basic block may be members of more than one chain, whether as head members or other members.

Once the set of chains for the selected basic block has been generated, operation continues from block 308 where it is determined whether other basic blocks remain to be analyzed. It is noted that the order of determining whether a basic block satisfies the criteria for chain generation (e.g., block 306) and actually generating chains for that basic block may differ in different embodiments. For example, rather than sequentially testing basic blocks and generating chains for qualifying blocks, all basic blocks may first be tested and then chains may be generated in sequential or concurrent fashion for the basic blocks that qualify. Any other suitable ordering of these functions may also be employed.

Once a respective set of chains has been generated for each qualifying basic block, the sets may be recursively selected (block 312) to determine whether chains may be joined across basic blocks. In one embodiment, the sets of chains may be selected beginning with the basic block closest to the procedure's exit point, although recursion may begin at other points within the procedure. For a selected basic block having a corresponding set of chains, each given chain is examined to determine whether its head member is a direct or indirect memory access (block 314). If the head member is a direct memory access, the given chain is marked as a prefetch candidate (block 316). As with marking individual accesses as prefetch candidates, marking a chain as a prefetch candidate may include storing a value indicative of prefetch candidacy within a data structure corresponding to the chain.

If the head member is an indirect memory access, then chains of predecessor basic blocks are examined to identify a predecessor chain having a memory access from which the given chain in the selected basic block depends (block 318). If the predecessor chain is marked as a prefetch candidate and the execution probability of the selected basic block relative to the predecessor basic block equals or exceeds a threshold value (block 320), then the predecessor chain is joined to the given chain and the resultant chain is marked as a prefetch candidate (block 322). In one embodiment, when two chains are joined, a single chain results. That is, the given chain may not be retained as a distinct entity, but will instead be subsumed within the predecessor chain. If the conditions of block 320 are not satisfied, the given chain is not joined to the predecessor chain and is not marked as a prefetch candidate (block 324). In some embodiments, it is contemplated that a broader prefetch candidacy criterion may be applied with respect to the head member of the given chain. Specifically, in one embodiment, if the head member of the given chain does not depend on another memory access that is a prefetch candidate, then the given chain may be marked as a prefetch candidate regardless of the status of any predecessor chain. For example, the head member may be an indirect memory access that depends on another memory access that is predictably invariant with respect to the procedure, such as a pointer reference.

It is noted that recursion may be required to determine whether or not the predecessor chain is a prefetch candidate. For example, the head of the predecessor chain may itself be an indirect memory access, which may result in yet another predecessor chain being identified and tested as per the above steps. In some embodiments, determining the execution probability of the selected basic block relative to the predecessor basic block may include determining a ratio of the execution probabilities of each block relative to the procedure header. That is, the execution probabilities considered in block 306 as described above may be employed. The threshold value employed in block 320 may be, but need not be, the same as the threshold value employed in block 306, and may be determined in a fashion similar to or distinct from that threshold. It is noted that in some embodiments, if the predecessor basic block and the selected basic block are determined to be control equivalent, the threshold value of block 320 may be considered to be satisfied without explicitly comparing execution probabilities.

Subsequently, if chains remain to be analyzed within the selected basic block (block 326), another given chain is selected (block 328) and processing proceeds from block 314. If no chains remain to be analyzed within the selected basic block, and other basic blocks remain to be selected (block 330), processing may continue from block 312 where another basic block is selected. Otherwise, operation may complete (block 332).

Generally speaking, the method of FIG. 3 may operate to first generate memory access chains within basic blocks that are likely to execute, and then to attempt to join such chains across basic blocks, again dependent on the relative likelihood of execution between the blocks across which joining is to occur. In so doing, the method may generally attempt to maximize the length of chains subject to execution probability constraints, and to produce a set of chains marked as prefetch candidates (as distinct from individual memory accesses that may be marked as prefetch candidates). As an example, application of the method of FIG. 3 to the two basic blocks of the for-loop example given above may first result in the generation of one chain for each block—the chains (a[i], b[t1]) and (c[t2], d[t3]), respectively, provided that the execution probability of the if-statement block equals or exceeds the threshold of block 306. These chains may then be joined to result in the prefetch candidate chain (a[i], b[t1], c[t2], d[t3]), provided that the execution probability of the if-statement block relative to the for-statement block equals or exceeds the threshold of block 320 (which may be the same as the threshold of block 306).

It is noted that within the resultant set of chains generated for a procedure by operation of the above-described method, certain memory accesses may be members of more than one chain. For example, a particular direct memory access may be identified as the head of two or more distinct chains. In some embodiments, chains may also overlap in certain members other than their heads. For example, a given indirect memory access may depend from more than one direct or indirect memory access, such as when the memory address of the given indirect access is a function of the results of two or more prior accesses. The given indirect access may thus be a member of two or more chains having distinct heads. In some embodiments, the data structure employed to represent the chains generated by the above-described method may be configured to represent the extent to which different chains overlap or share members. For example, the data structure may be configured as a tree, graph or other type of network representation. In other embodiments, different chains may be stored as distinct entities without an explicit representation of overlap among chains.

A number of variants of the illustrated method are possible and contemplated. For example, rather than beginning at the exit point of the procedure and recursively examining basic blocks to attempt to link a head element of a chain to a tail element of a predecessor chain in a predecessor block, an alternative embodiment of the method may begin at the entry point of the procedure and examine basic blocks to attempt to link a tail element of a chain to a head element of a successor chain in a successor block, applying execution probability threshold considerations similar to those described above.

Chains of indirect memory references generated from the operation of the method of FIG. 3, or a suitable variant thereof, may be employed in the generation of prefetch operations, as described below. However, it is contemplated that applications for such chains need not be restricted to prefetch generation. Generally speaking, each chain may represent a probabilistic dependency relationship among a number of memory access operations. This information may be employed to perform any suitable code or memory mapping transformation. For example, in some embodiments, compiler 200 may be configured to attempt to allocate portions of a memory address space to accesses in an identified chain in order to ensure that the accesses are aligned or are located within the same virtual memory page, independently of any prefetching operations that may be inserted by compiler 200.

Generating Prefetch Information Using Indirect Memory Access Chains

In some embodiments, compiler 200 may be further configured to employ indirect memory access chains, whether generated in accordance with the techniques described above or by some other method, to generate prefetch information for source code 210. Such prefetch information may be inserted into object code 230 in the form of one or more different instructions or operations executable by a processor implementing the target architecture (e.g., processor 110) to prefetch data from a particular address. Generally speaking, as described above, a given chain of a procedure may represent a sequence of dependent memory access operations stemming from a head memory access. If the head access varies predictably across iterations or invocations of the procedure, then it may be possible to prefetch dependent memory accesses within the chain for subsequent iterations or invocations of the procedure, such that data required in the future by the chain is more likely to be cached or otherwise more local to the executing processor 110.

Figure 4:
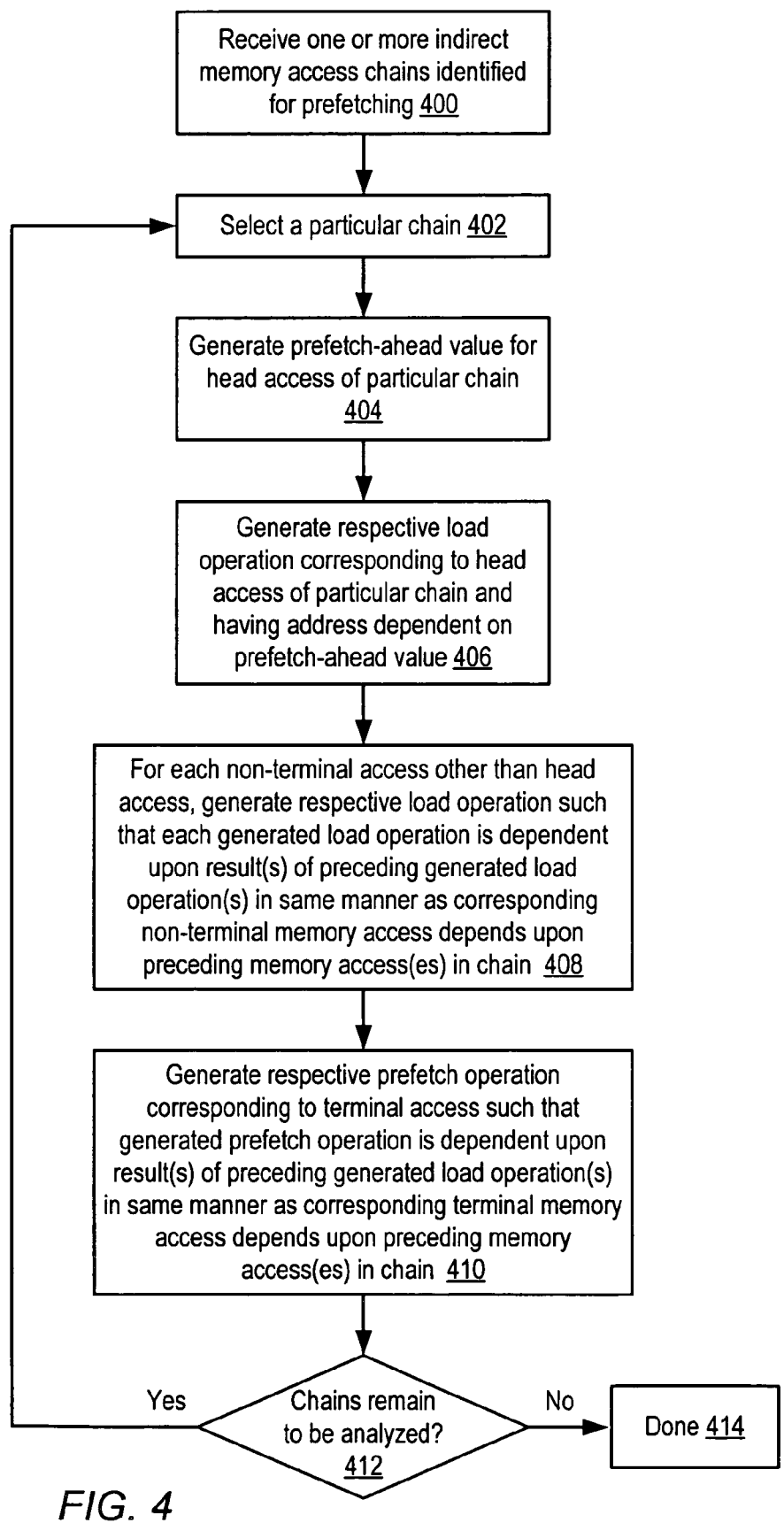
FIG. 4 is a flow diagram illustrating one embodiment of a method of generating prefetch information for chains of indirect memory accesses within a source code procedure.

One embodiment of a method of generating prefetch information for chains of indirect memory accesses, which in various embodiments may be implemented by optimizer 206 or by another component of compiler 200, is illustrated in FIG. 4. Referring collectively to FIGS. 1, 2 and 4, operation begins in block 400 where one or more indirect memory access chains of a procedure that are marked or identified for prefetching are received. For example, such chains may correspond to those chains marked for prefetching that are generated according to FIG. 3, as described above, or by any other suitable technique. In some embodiments, chain generation may be performed within compiler 200 by functionality that is distinct from functionality configured for prefetch information generation, while in other embodiments both functions may be integrated.

A particular chain may then be selected (block 402) and a prefetch-ahead value may be generated for the head of the particular chain (block 404). Generally speaking, the prefetch-ahead value may correspond either exactly or approximately to the difference in the memory address for the head access of the chain for two successive occurrences of the head access. In some embodiments, the prefetch-ahead value may be a function of the stride of the head access, which may be determined as described below. In various embodiments, the stride may be a constant value known at compile time, a constant value unknown at compile time, or a more complex function.

One example of a technique for determining a prefetch-ahead value is as follows. Generally, the prefetch-ahead value may be determined from the prefetch-ahead distance and stride, $$\text{prefetch\_ahead\_value} = \text{prefetch\_ahead\_dist} * \text{stride}$$

where stride may be determined as described above. Where the stride is a constant known at compile time, the prefetch-ahead value may be entirely computable at compile time. Where the stride is a constant unknown at compile time, the prefetch-ahead value may be finally determined at run time, for example as the result of an integer multiplication operation. In some cases, such as when the stride value is equal to or sufficiently close to a power of two, a shift operation may be used at run time instead of an integer multiplication operation, which may improve performance in processor embodiments having relatively slow multiplication. Where the stride is a more complex function, additional instructions may be inserted within object code 230 to compute the stride value at run time. It is noted that in some embodiments, if the stride for the head access of a given chain cannot be predictably determined by compiler 200, prefetch processing of the given chain may abort without generating prefetch information for the given chain.

In one embodiment, the prefetch-ahead distance may be determined as follows:

$$\text{prefetch\_ahead\_dist} = \min(\text{covered\_latency}, \text{prefetch\_queue\_util})$$

where $$\text{covered\_latency} = \frac{\text{prefetch\_latency}}{\text{prefetch\_cover\_dist} * \text{iteration\_time}}$$

and $$\text{prefetch\_queue\_util} = \frac{\text{outstanding\_prefetches}}{\text{prefetch\_candidates}}.$$

Here, prefetch_latency may correspond to the expected latency of a prefetch operation, which may be determined according to any suitable means (e.g., empirically, heuristically) and may reflect specific characteristics of the target processor and/or system such as cache miss rates and latencies. For example, prefetch_latency may be determined as a sum of various memory latencies within a system weighted by the respective probabilities of a given memory access incurring each latency. The quantity prefetch_cover_dist may generally correspond to the number of iterations of the procedure that may be covered by a single prefetch. For example, a prefetch may retrieve one or several cache lines of data at a time, which may be sufficient to cover the data requested by a number of iterations if the stride is small relative to the cache line size. In one embodiment, prefetch_cover_dist may be determined as the ratio of the cache line size to the stride. In some embodiments, prefetch_cover_dist may generally indicate the number of times an iterative procedure may need to be unrolled to avoid generating redundant prefetch operations (e.g., prefetch operations that may overlap addresses that were previously prefetched). The quantity iteration_time may correspond to the expected execution time of a single iteration of the procedure, which in one embodiment may be determined as the sum of the execution times of each basic block within the procedure weighted by their respective execution probabilities.

Generally speaking, prefetch_latency and iteration_time may determine the number of iterations ahead of a current iteration for which data should be prefetched. For example, if a prefetch takes twice as long to execute as an iteration of the procedure and covers one iteration of the procedure, covered_latency may be equal to 2, indicating that data at least two iterations ahead of the current iteration should be prefetched in order to be reasonably certain that the prefetched data will arrive in time to avoid stalling execution.

In some embodiments, a given implementation of the target architecture may have limited resources for processing prefetch operations. For example, processor 110 may implement a queue for storing outstanding prefetch operations that have been requested but not yet completed. If such a queue is at capacity and additional prefetches are requested, processor 110 may stall, which may degrade code execution performance, or the additional prefetches may be discarded without being serviced. In one embodiment, the prefetch_queue_util metric may be used to limit prefetch_ahead_dist in cases where prefetch operation generation may be constrained by hardware operation. Specifically, outstanding_prefetches may correspond to the maximum number of outstanding prefetches the target architecture may support, which may vary across different hardware implementations. The quantity prefetch_candidates may correspond to the number of prefetches expected to be produced for the current procedure, with a minimum of 1.

If this ratio is small, then the generated prefetches may occupy a significant fraction of the hardware prefetch capacity, and prefetch_ahead_dist may be correspondingly reduced. By contrast, if this ratio is large, then hardware prefetch capacity utilization may be relatively low, and prefetch_ahead_dist may be increased. In some embodiments, the ratio may employ additional terms or scaling factors to facilitate the mapping of prefetch resource capacity utilization to the prefetch-ahead distance. It is noted that in some embodiments, prefetch_queue_util may be omitted and prefetch_ahead_dist may depend solely on covered_latency.

Once the prefetch-ahead value or a suitable expression for the prefetch-ahead value has been determined, a respective load operation corresponding to the head access of the particular chain and having a memory address that is dependent on the prefetch-ahead value or expression may be generated (block 406). For example, the address of the generated load operation may correspond to the address of the head access plus the prefetch-ahead value. For each non-terminal memory access in the particular chain (that is, each memory access other than the last memory access in the chain), a respective load operation may be generated such that each generated load operation is dependent upon the result(s) of preceding generated load operation(s) in the same manner as its corresponding non-terminal memory access depends upon preceding memory accesses in the particular chain (block 408).

Additionally, a respective prefetch operation corresponding to a terminal memory access of the particular chain may be generated such that the prefetch operation is dependent upon the result(s) of preceding generated load operation(s) in the same manner as its corresponding terminal memory access depends upon preceding memory accesses in the particular chain (block 410). It is noted that in embodiments where branching and/or overlapping of chains is supported, a chain may have more than one terminal access. If additional chains remain to be considered (block 412), operation may continue from block 402 where another chain is selected. Otherwise, the operation of the method may be complete (block 414).

It is noted that generation of a given load or prefetch operation may include insertion of the generated operation within intermediate representation 220 or object code 230 "on the fly," or as the load and prefetch operations are generated. Alternatively, load and prefetch operations may first be generated in their entirety for a given chain or an entire procedure, and subsequently inserted or merged into intermediate representation 220 or object code 230. Ultimately, the generated load and prefetch operations may be reflected within object code 230 as instructions executable by a processor (e.g., processor 110) to implement the load and prefetch operations.

One example illustrating the result of load and prefetch operation generation for the for-loop example given above is as follows. In this embodiment, the generated load operations are illustrated as additional memory references at the source-code level of abstraction. However, it is contemplated that the load operations may also be generated within intermediate representation 220 or inserted within object code 230 as specific instructions defined for the target architecture.

```
for(i=0; i<n; i++)
    t1 = a[i];
    tmp_t1 = a[i+prefetch_ahead_value];
    t2 = b[t1];
    tmp_t2 = b[tmp_t1];
    if(condition) {
        t3 = c[t2];
        tmp_t3 = c[tmp_t2];
        t4 = d[t3];
        prefetch(address_of(d[tmp_t3]));
    }
}
```

In this example, the particular chain includes members (a[i], b[t1], c[t2], d[t3]). As shown, a load operation a[i+prefetch_ahead_value] corresponding to the head member of the chain is inserted into the code. The address of this operation is dependent upon the prefetch-ahead value, in this case being the sum of the prefetch-ahead value and the current value of the iteration variable. The result of this load operation is assigned to variable tmp_t1 and forms the basis for the second generated load operation b[tmp_t1], which corresponds respectively to memory access b[t1]. In turn, the third generated load operation c[tmp_t2] depends on the load operation b[tmp_t1] and corresponds to memory access c[t2]. Finally, the generated prefetch operation corresponds to the terminal access in the chain, d[t3], and depends on the third generated load operation c[tmp_t2].

It is contemplated that in some embodiments, the generated load and prefetch operations may appear in any order relative to the memory accesses in the particular chain, so long as dependency relationships among the generated load and prefetch operations and among the accesses in the particular chain are preserved. For example, instead of being interleaved among their respective memory accesses as shown above, the generated load and prefetch operations may be arranged or grouped in some other way. In some embodiments, further optimizations may be performed with respect to the generated load and prefetch operations. For example, partial dead code elimination techniques may be used to detect that the only dependency on generated load operation b[tmp_t1] is the generated load operation c[tmp_t2] within the if-statement. In one embodiment, the b[tmp_t1] operation may be relocated inside the if-statement, which may improve code performance by omitting execution of the operation in the event the if-statement block is not executed.

In some embodiments, the load operations that are generated for corresponding accesses of a chain may be defined as non-faulting load operations if the target architecture defines such functionality. Generally speaking, a non-faulting load operation may behave similarly to an ordinary load operation, except that certain types of exceptions or faults may be suppressed for non-faulting load operations. For example, load exceptions due to misaligned addresses, address space protection violations, or other types of address-related faults may be suppressed. In various embodiments, non-faulting load operations may be distinguished from ordinary load operations by virtue of different opcodes, prefixes, mode bits or any other suitable technique defined by the target architecture. Also, in some embodiments, the specific types of faults that are suppressed for non-faulting loads may vary across different types of target architectures, and for certain implementations, these types of faults may be configurable (e.g., through use of a programmable mode register, exception mask register, or other suitable technique). In some target architectures that support virtual memory techniques, page faults may not be suppressed for non-faulting load operations.

Generally speaking, use of non-faulting load operations for prefetch-related memory activity may improve application performance. That is, since prefetching activity is typically speculative, it may be undesirable to allow side effects of prefetching activity to interrupt the flow of application processing. However, if a target architecture does not support non-faulting load operations, ordinary load operations may be employed. Similarly, if a particular application is particularly sensitive to data security issues (e.g., such that suppressing protection-related faults for prefetching may compromise security), ordinary load operations may be used, or only certain types of faults may be suppressed in implementations that support configurable fault suppression. However, in some embodiments, the use of non-faulting load operations may be necessary if an application is sensitive to differences in runtime behavior that may be introduced by prefetch optimizations. For example, if a fault due to a prefetch-related load operation would cause an application to behave differently than if the prefetch had been omitted entirely, then the use of non-faulting load operations for prefetch may be required to preserve transparency of the optimization.

Broadly speaking, both the prefetch operations and load operations that may be generated for memory chains through operation of the method of FIG. 4 may be referred to as prefetch information. However, in some embodiments, the prefetch operation corresponding to the terminal memory access in a chain may differ from the load operations corresponding to other members of the chain. Generally speaking, both prefetch operations and load operations may result in data movement within the memory hierarchy of a processor or system. However, in contrast to a load operation, a prefetch operation may not produce a result for utilization by another operation. In some embodiments, prefetch operations may be implemented by a processor as heuristic operations or hints having lower priority in execution than other memory-related operations. For example, prefetch operations may be not be guaranteed to execute and may be postponed or discarded if the volume of other, higher-priority memory-related operations warrants. It is noted that in some embodiments, the prefetch operation generated for a terminal memory access of a chain may be implemented as a load operation similar to the load operations generated for non-terminal accesses of a chain. In some such embodiments, the result of the load operation may be assigned to a dummy variable or discarded rather than passed to a successor load operation.

Figure 5:
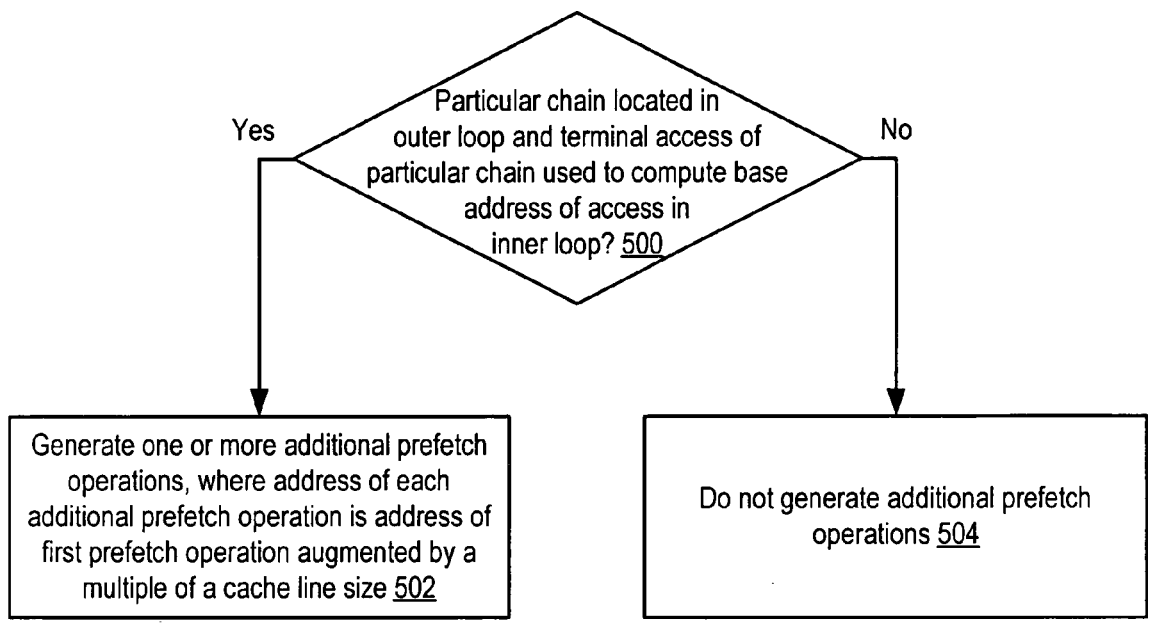
FIG. 5 is a flow diagram illustrating another embodiment of a method of generating prefetch information for chains of indirect memory accesses within a source code procedure.

As described above, the method of FIG. 4 may operate to generate prefetch information that is configured to prefetch a single stride of a procedure that is some prefetch distance ahead of the current iteration of the procedure. However, variants on the generated prefetch information are possible and contemplated. One such embodiment is illustrated in the method of FIG. 5, which may operate in conjunction with the method of FIG. 4. For example, in one embodiment, block 410 of FIG. 4 may be configured to include the method of FIG. 5.

Operation of the method of FIG. 5 begins in block 500, where it is determined whether a particular chain is located in an outer loop procedure and whether the terminal access of the particular chain is used to compute the base address of a memory access in an inner loop (e.g., a nested loop within the outer loop procedure). If both of these conditions are true, then in addition to the first prefetch operation that corresponds to the terminal access of the particular chain, one or more additional prefetch operations may be generated, where the address targeted by each additional prefetch operation is the address targeted by the first prefetch operation augmented by a multiple of a cache line size of a processor implementing the target architecture (block 502). Otherwise, no additional prefetch operations are generated (block 504). In some embodiments, the cache line size used may correspond to the line size of the first-level data cache in a processor 110, although a line size of a second-level cache or other cache may also be employed.

Often, in procedures having nested loops, the data accessed by iterations of inner loops may be more likely to reside in contiguous portions of the memory address space than data accessed by iterations of outer loops. Correspondingly, data accessed by inner loops may be more likely to reside within contiguous cache lines. In the case of nested loops that satisfy the conditions of block 500, prefetching of additional cache lines following the address of the first prefetch operation may improve the performance of inner loops that address localized data. Referring to the above for-loop as an example, suppose that after the statement "t4=d[t3]" there is an inner loop that uses t4 as the base address and increments t4 by some amount for each iteration. Assuming a 64-byte cache line size for this example, application of the method of FIG. 5 may result in some number of additional prefetch operations being generated in addition to the prefetch operation corresponding to the terminal member of the chain:

prefetch(address_of(d[tmp_t3]));

prefetch(address_of(d[tmp_t3])+64);

prefetch(address_of(d[tmp_t3])+128);

The exact number of additional cache lines that are prefetched may vary. In one embodiment, the number may be a static value (e.g., one, two, etc.) while in other embodiments, the number of additional prefetches may depend on an analysis of the characteristics of the inner loop, such as its stride.

Figure 6:
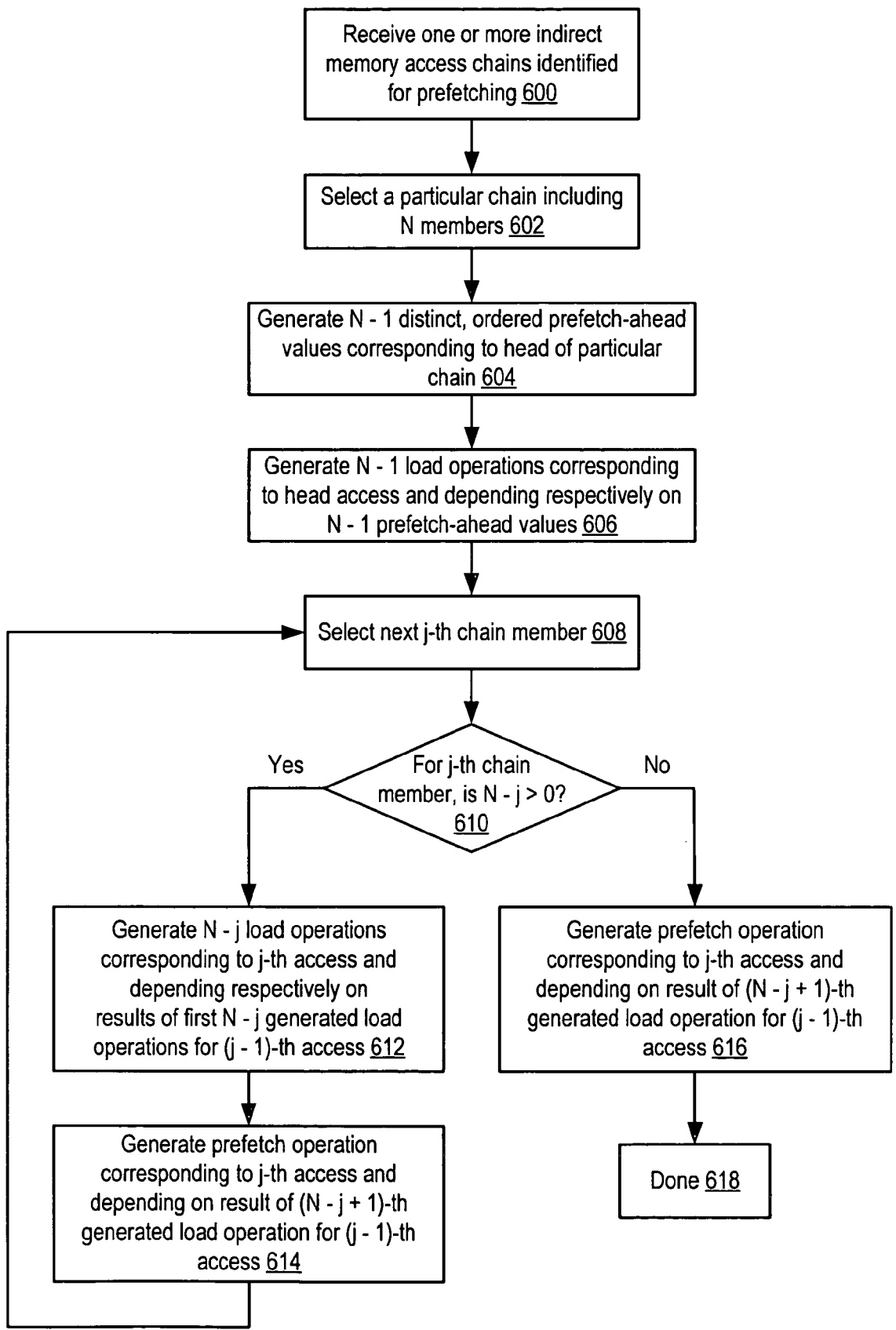
FIG. 6 is a flow diagram illustrating a third embodiment of a method of generating prefetch information for chains of indirect memory accesses within a source code procedure.

It is possible that any of the various load operations generated for a particular chain may incur cache misses when executed. In some embodiments, additional load and prefetch operations may be generated to attempt to avoid such cache misses. One embodiment of such a method is illustrated in FIG. 6. In the illustrated embodiment, operation begins in block 600 where one or more indirect memory access chains of a procedure that are marked or identified for prefetching are received. For example, such chains may correspond to those chains marked for prefetching that are generated according to FIG. 3, as described above, or by any other suitable technique.

A particular chain including a total of N members may then be selected (block 602), and N−1 distinct and ordered prefetch-ahead values may be generated for the head of the particular chain (block 604). Let the N members of the chain be numbered in order from 1 to N, and let the N−1 prefetch-ahead values be numbered from 1 to N−1. In one embodiment, a given prefetch-ahead value numbered k may be determined as follows:

$$\text{prefetch\_ahead\_value}_k = \text{prefetch\_ahead\_dist}*(\text{stride}+k-1)$$

where prefetch_ahead_dist and stride may be determined as described above. Thus, when the prefetch-ahead values are ordered according to k, each successive prefetch-ahead value reflects the stride following the previous value. It is noted that each stride value may correspond to a particular future iteration of the procedure.

N−1 load operations corresponding to the head access of the particular chain may then be generated, where the memory addresses of the N−1 load operations are ordered to depend respectively on the N−1 generated prefetch-ahead values (block 606). The next member given member numbered j of the particular chain may then be selected (e.g., by incrementing j, which may initially be set to 1 for the head memory access) (block 608). For a given member numbered j of the particular chain, if N−j is greater than zero (block 610) then N−j load operations may then be generated corresponding to the $j^{th}$ member of the chain, where the memory addresses of the N−j load operations are ordered to depend respectively on the results of the first N−j load operations generated for the $(j-1)^{th}$ member of the chain (block 612). Additionally, a prefetch operation may be generated for the $j^{th}$ member of the chain, where the address targeted by the prefetch operation is dependent on the result of the $(N-j+1)^{th}$ load operation generated for the $(j-1)^{th}$ member of the chain (block 614). Operation may then proceed from block 608 where the next chain member is selected.

If N−j is determined not to be greater than zero at block 606 for a given $j^{th}$ member of the chain, then a prefetch operation may be generated for the $j^{th}$ member of the chain without generating other load operations, where the address targeted by the prefetch operation is dependent on the result of the $(N-j+1)^{th}$ load operation generated for the $(j-1)^{th}$ member of the chain (block 616). Operation of the method may then be complete (block 618). As noted above with respect to FIG. 4, generated load and prefetch operations may be inserted into intermediate representation 220 or object code 230 as they are generated, or during a later phase of compilation, and may ultimately be reflected within object code 230 as instructions specific to the target architecture and executable by a processor to implement the generated operations.

One example illustrating a result of an application of the method of FIG. 6 to generate additional prefetch information for the for-loop example given above is as follows:

```
for(i=0; i<n; i++)
    t1 = a[i];
    tmp_t1 = a[i+prefetch_ahead_value_1];
    tmp1_t1 = a[i+prefetch_ahead_value_2];
    tmp2_t1 = a[i+prefetch_ahead_value_3];
    t2 = b[t1];
    tmp_t2 = b[tmp_t1];
    tmp1_t2 = b[tmp1_t1];
    prefetch(address_of(b[tmp2_t1]));
    if(condition) {
        t3 = c[t2];
        tmp_t3 = c[tmp_t2];
        prefetch(address_of(c[tmp1_t2]));
        t4 = d[t3];
        prefetch(address_of(d[tmp_t3]));
    }
}
```

In this example, as before, the particular chain under consideration includes members (a[i], b[t1], c[t2], d[t3]). Thus, N in this case is 4, and N−1=3 prefetch-ahead values denoted prefetch_ahead_value_k have been generated. For the head member of the chain a[i], 3 corresponding load operations have been generated, each one depending on a respective one of the prefetch_ahead_value_k values. For the second member of the chain, j=2, and N−j or 2 load operations are generated (b[tmp_t1] and b[tmp1_t1]) that depend respectively on the results of the first 2 load operations generated for the $(J-1)^{th}$ member, which is the head member. Also, a prefetch operation is generated targeting an address (b[tmp2_t1]) that depends on the result of the $(N-j+1)^{th}$ load operation (i.e., the third load operation) generated for the head member.

Similarly, for the third member of the chain, j=3, and N−j or 1 load operations is generated (c[tmp_t2]) that depends respectively on the results of the first load operation generated for the $(j-1)^{th}$ member, which is the second member. Also, a prefetch operation is generated targeting an address (c[tmp1_t2]) that depends on the result of the $(N-j+1)^{th}$ load operation (i.e., the second load operation) generated for the second member. Finally, for the fourth member of the chain, j=4. Since N−j=0 is not greater than zero, no load operations are generated corresponding to the fourth member. Instead, a prefetch operation is generated targeting an address (d[tmp_t3]) that depends on the result of the (N−j+1) load operation (i.e., the first load operation) generated for the third member.

It is noted that as described above for the case where only a single respective load operation or prefetch operation was generated for a corresponding member of a chain, in the case where multiple load and prefetch operations may be generated, the generated operations need not be executed in a particular order relative to the members of the chain so long as dependency relationships among the generated operations are satisfied. That is, while the additional operations may be generated in a particular order so as to simplify management of the dependency relationships during the generation process, the actual placement of the generated operations within the resultant object code 230 may vary dependent upon code optimization or other factors.

As mentioned previously, a given direct or indirect access may be a member of more than one chain. However, redundantly generating prefetch information for an access may not improve code performance, and may in some instances reduce performance by delaying prefetches that are not redundant. In some embodiments, when a given access appears in more than one chain for which prefetch information is being generated, compiler 200 may be configured to generate only a single corresponding load or prefetch operation for the given access. For example, compiler 200 may be configured to track whether the given memory access has been previously referenced during operation of the methods of FIGS. 4 or 6.

Additionally, in some embodiments, the degree to which accesses appear in more than one chain may be used as a criteria to select particular chains for generation of prefetch information, or to select whether additional prefetch information to ameliorate cache misses will be generated for a particular chain (e.g., according to the method of FIG. 6). For example, chains that share one or more memory accesses may be selected or prioritized for prefetch generation, or for additional prefetch information generation, over chains that do not share memory accesses. In other embodiments, chain selection for various degrees of prefetch information generation may depend on other factors in addition to or instead of the degree of member overlap among chains. For example, longer chains may be selected over shorter ones. Factors other than chain properties may also be considered. For example, a chain in a procedure that is expected to iterate a large number of times may be preferred for prefetch generation over a chain that is expected to be less frequently executed. While these or numerous other factors may be employed to distinguish chains for prefetching, such distinction is not necessary. In some embodiments, all identified chains may be selected for generation of prefetching information according to the methods of FIGS. 4 or 6, or suitable variants thereof.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    identifying a plurality of basic blocks between an entry point and an exit point of a procedure, wherein the procedure includes a control statement governing execution of the procedure;
    for a given one of said plurality of basic blocks, determining whether a probability of execution of said given basic block relative to said control statement equals or exceeds a first threshold value, and in response to determining that said probability of execution relative to said control statement equals or exceeds said first threshold value, generating a respective set of one or more chains of indirect memory accesses corresponding to said given basic block, wherein each chain included in said respective set comprises at least a respective head memory access that does not depend for its memory address computation on another memory access within said given basic block;
    for a given chain corresponding to a particular one of said plurality of basic blocks and including a head memory access that depends for its memory address computation on another memory access included in a predecessor chain within a different basic block, determining whether a ratio of a probability of execution of said particular basic block relative to said control statement and a probability of execution of said different basic block relative to said control statement equals or exceeds a second threshold value; and
    in response to determining that said ratio equals or exceeds said second threshold value, joining said given chain to said predecessor chain.

2. The method as recited in claim 1, further comprising:
    identifying as prefetch candidates one or more predictably variant memory accesses of said procedure that do not depend for memory address computation on other memory accesses within said procedure; and
    identifying as prefetch candidates one or more indirect memory accesses of said procedure that depend for memory address computation, either directly or indirectly, on one or more prefetch candidate memory accesses.

3. The method as recited in claim 2, wherein generating said respective set of chains corresponding to said given basic block further comprises:
    determining whether a given memory access that does not depend for its memory address computation on another memory access within said given basic block is identified as a prefetch candidate; and
    in response to determining that said given memory access is identified as a prefetch candidate, selecting said given memory access as a head member of a new chain of said respective set and appending each memory access within said given basic block that depends for its memory address computation, directly or indirectly, on said given memory access to said new chain.

4. The method as recited in claim 2, further comprising:
    for each chain having a head member that is a predictably variant memory access, marking said chain as a prefetch candidate.

5. The method as recited in claim 4, wherein joining said given chain to said predecessor chain is further dependent upon recursively determining whether said predecessor chain is marked as a prefetch candidate, such that if said predecessor chain is not marked as a prefetch candidate or eligible to be joined with another predecessor chain that is marked as a prefetch candidate, said given chain is not joined to said predecessor chain.

6. The method as recited in claim 1, wherein said determining whether a probability of execution of said given basic block relative to said control statement equals or exceeds a first threshold value comprises determining whether said given basic block is control equivalent to said control statement.

7. The method as recited in claim 1, wherein said procedure is an iterative loop procedure.

8. The method as recited in claim 7, wherein said control statement corresponds to one or more programming language statements collectively configured to control iteration of said procedure.

9. The method as recited in claim 8, wherein said control statement corresponds to a for-statement or a while-statement expressed in a high-level programming language.

10. The method as recited in claim 1, wherein said first threshold value equals said second threshold value.

11. A computer-accessible storage medium storing instructions, wherein the instructions are executable to:
    identify a plurality of basic blocks between an entry point and an exit point of a procedure, wherein the procedure includes a control statement governing execution of the procedure;
    for a given one of said plurality of basic blocks, determine whether a probability of execution of said given basic block relative to said control statement equals or exceeds a first threshold value, and in response to determining that said probability of execution relative to said control statement equals or exceeds said first threshold value, generate a respective set of one or more chains of indirect memory accesses corresponding to said given basic block, wherein each chain included in said respective set comprises at least a respective head memory access that does not depend for its memory address computation on another memory access within said given basic block;
    for a given chain corresponding to a particular one of said plurality of basic blocks and including a head memory access that depends for its memory address computation on another memory access included in a predecessor chain within a different basic block, determine whether a ratio of a probability of execution of said particular basic block relative to said control statement and a probability of execution of said different basic block relative to said control statement equals or exceeds a second threshold value; and
    in response to determining that said ratio equals or exceeds said second threshold value, join said given chain to said predecessor chain.

12. The computer-accessible storage medium as recited in claim 11, wherein the instructions are further executable to:
    identify as prefetch candidates one or more predictably variant memory accesses of said procedure that do not depend for memory address computation on other memory accesses within said procedure; and identify as prefetch candidates one or more indirect memory accesses of said procedure that depend for memory address computation, either directly or indirectly, on one or more prefetch candidate memory accesses.

13. The computer-accessible storage medium as recited in claim 12, wherein to generate said respective set of chains corresponding to said given basic block, the instructions are further executable to:

determine whether a given memory access that does not depend for its memory address computation on another memory access within said given basic block is identified as a prefetch candidate; and in response to determining that said given memory access is identified as a prefetch candidate, select said given memory access as a head member of a new chain of said respective set and appending each memory access within said given basic block that depends for its memory address computation, directly or indirectly, on said given memory access to said new chain.

14. The computer-accessible storage medium as recited in claim 12, wherein the instructions are further executable to:

for each chain having a head member that is a predictably variant memory access, mark said chain as a prefetch candidate.

15. The computer-accessible storage medium as recited in claim 14, wherein to join said given chain to said predecessor chain, the instructions are further executable to recursively determine whether said predecessor chain is marked as a prefetch candidate, such that if said predecessor chain is not marked as a prefetch candidate or eligible to be joined with another predecessor chain that is marked as a prefetch candidate, said given chain is not joined to said predecessor chain.

16. The computer-accessible storage medium as recited in claim 11, wherein to determine whether a probability of execution of said given basic block relative to said control statement equals or exceeds a first threshold value, the instructions are further executable to determine whether said given basic block is control equivalent to said control statement.

17. The computer-accessible storage medium as recited in claim 11, wherein said procedure is an iterative loop procedure.

18. The computer-accessible storage medium as recited in claim 17, wherein said control statement corresponds to one or more programming language statements collectively configured to control iteration of said procedure.

19. The computer-accessible storage medium as recited in claim 18, wherein said control statement corresponds to a for-statement or a while-statement expressed in a high-level programming language.

20. A system, comprising:

a system memory configured to store instructions; and one or more processors, wherein the instructions are executable by at least one of the one or more processors to:

identify a plurality of basic blocks between an entry point and an exit point of a procedure, wherein the procedure includes a control statement governing execution of the procedure;

for a given one of said plurality of basic blocks, determine whether a probability of execution of said given basic block relative to said control statement equals or exceeds a first threshold value, and in response to determining that said probability of execution relative to said control statement equals or exceeds said first threshold value, generate a respective set of one or more chains of indirect memory accesses corresponding to said given basic block, wherein each chain included in said respective set comprises at least a respective head memory access that does not depend for its memory address computation on another memory access within said given basic block;

for a given chain corresponding to a particular one of said plurality of basic blocks and including a head memory access that depends for its memory address computation on another memory access included in a predecessor chain within a different basic block, determine whether a ratio of a probability of execution of said particular basic block relative to said control statement and a probability of execution of said different basic block relative to said control statement equals or exceeds a second threshold value; and in response to determining that said ratio equals or exceeds said second threshold value, join said given chain to said predecessor chain.

* * * * *